Jan. 23, 1968   J. A. RIVEGLIA   3,365,205
CHUCK AND OPERATING MECHANISM
Filed March 5, 1965   4 Sheets-Sheet 3

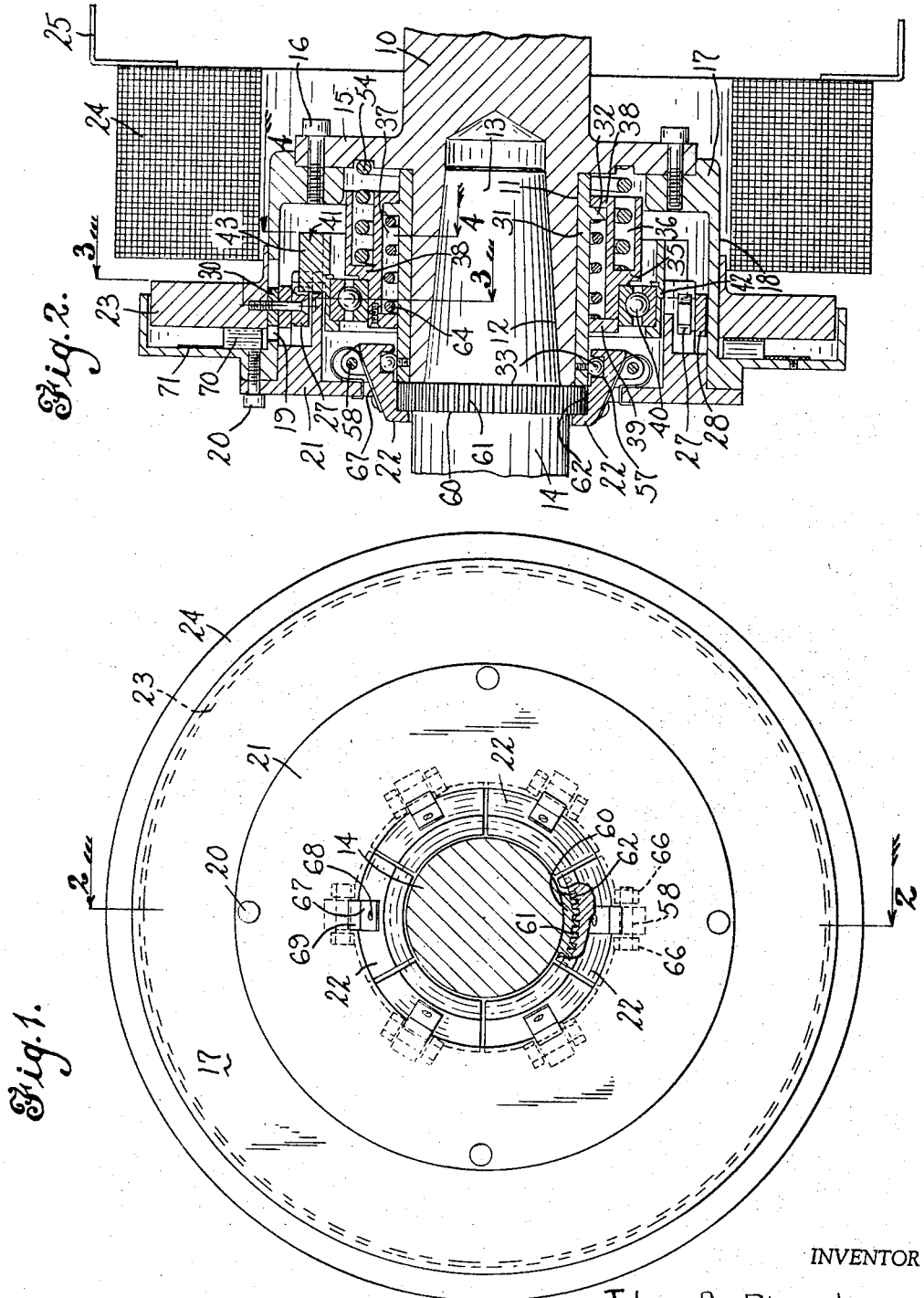

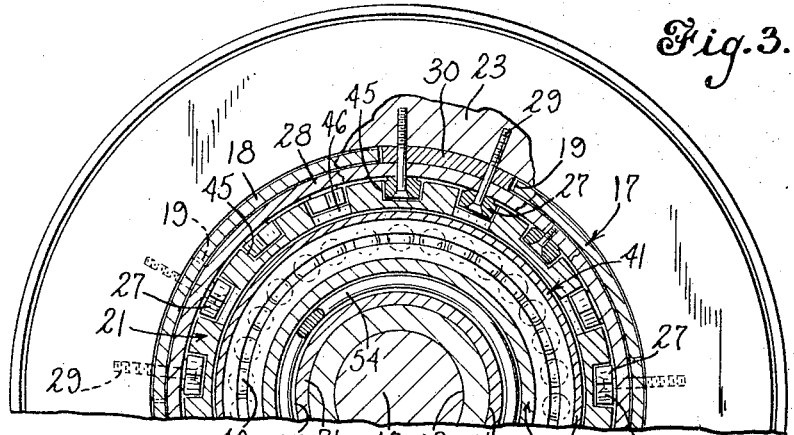
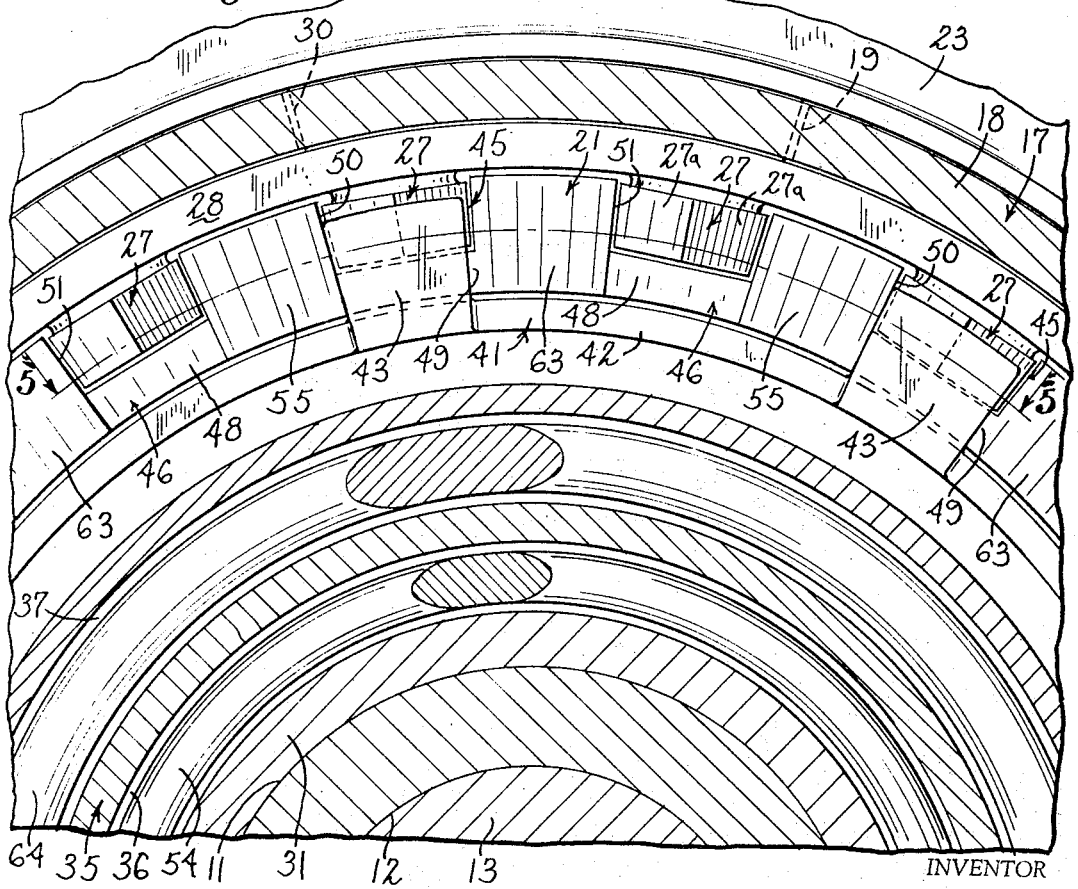

INVENTOR
John A. Riveglia
BY Delio and Montgomery
ATTORNEYS

Jan. 23, 1968  J. A. RIVEGLIA  3,365,205
CHUCK AND OPERATING MECHANISM
Filed March 5, 1965  4 Sheets-Sheet 4
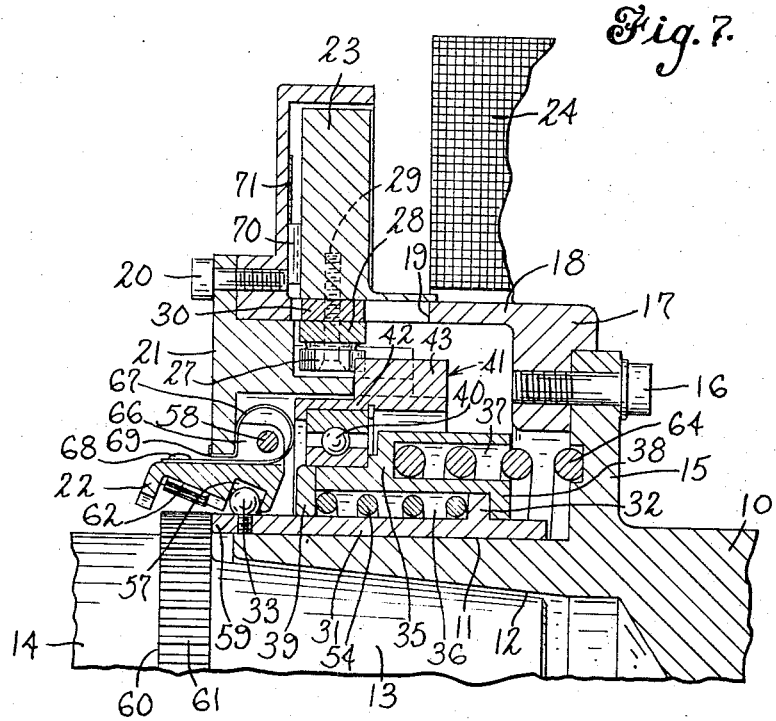
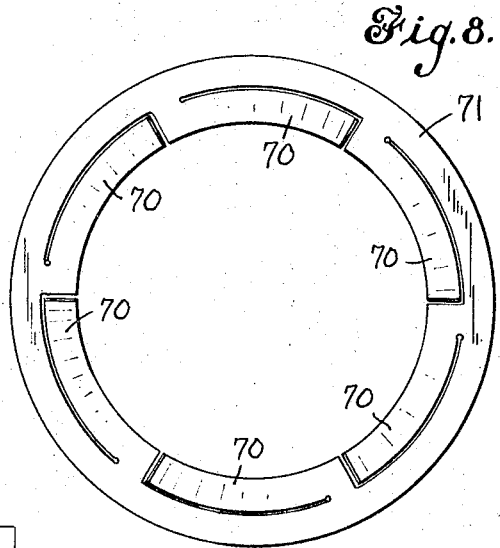
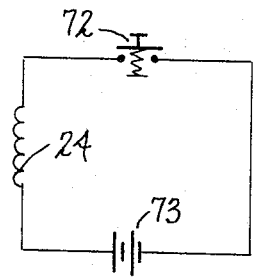
INVENTOR
John A. Riveglia
BY Delio and Montgomery
ATTORNEYS

United States Patent Office 3,365,205
Patented Jan. 23, 1968

3,365,205
CHUCK AND OPERATING MECHANISM
John A. Riveglia, Somers, Conn., assignor to Pratt & Whitney Inc., West Hartford, Conn.
Filed Mar. 5, 1965, Ser. No. 437,491
12 Claims. (Cl. 279—77)

ABSTRACT OF THE DISCLOSURE

A workpiece holding mechanism having actuated jaws positionable in a plurality of finite positions. The jaws are moved between the finite positions by an actuating member. The actuating member is controlled in its degree of movement from position to position in a given sequence by a camming and detent arrangement which controls the sequence of movement of the actuating member and the degree of movement between each position.

---

This invention relates to sequentially operated mechanisms, and more particularly relates to a work holding device which is arranged for automatic operation in positioning an actuated device or member sequentially in a finite plurality of stable positions.

The present invention provides a new and improved mechanism for sequentially positioning a member in one of a plurality of finite operating positions. The invention has particular application in a chuck or similar device for holding a tool or tool holder for rotation therewith and for positively ejecting such tool or tool holder therefrom upon command, and will be described in such embodiment. A chuck or chucking device embodying the invention is arranged to be impulse-actuated by an electrical signal either to clamp an object therein or release and at least partially eject an object therefrom. This construction is quite adaptable for operation in conjunction with automatic tool changers and similar apparatus arranged to selectively position and remove an object from the chuck. A chucking device embodying the invention is so constructed and arranged as to always be in one of a finite number of states or positions. For example, either in a tool clamping position or a tool ejecting position, and is further so constructed and arranged as to be only in one of such conditions. A chucking device embodying the invention is further arranged to be impulse-operated so that each received impulse causes the chuck to change from one condition to a succeeding condition.

Accordingly, an object of this invention is to provide a new and improved rotary chuck.

Another object of this invention is to provide a new and improved chucking device which is always either in a tool-grasping position or a tool-ejecting condition.

Another object of this invention is to provide a device of the type described which is impulse-operated so that each received impulse switches the condition of the apparatus.

A further object of this invention is to provide a new and improved chuck for positively engaging and holding a tool or tool holder.

A still further object of the invention is to provide a new and improved mechanism having actuated means which have a plurality of finite operating positions and actuating means for sequentially positioning the actuated means in only one of said finite positions.

The features of the invention which are believed to be novel are set forth with particularity in the claims appended to and forming a portion of this specification. However, the invention both as to its organization and operation together with further objects and advantages thereof, may best be appreciated by reference to the following detailed description, taken in conjunction with the drawings in which:

FIG. 1 is a front view of a device embodying the invention with a tool holder shown therein, in section;

FIG. 2 is a sectional view of the chuck of FIG. 1 seen in the plane of line 2—2 of FIG. 1;

FIG. 3 is a view seen in the plane of line 3—3 of FIG. 2;

FIG. 4 is a sectional view seen in the plane of line 4—4 of FIG. 2;

FIG. 7 is a half sectional view similar to FIG. 2 but showing the chuck in a tool holder ejecting condition;

FIG. 8 is a view in elevation showing an element of the chucking mechanism; and

FIG. 9 is a schematic diagram of a circuit which may be utilized to actuate the chucking element of the foregoing drawings.

Figure 5:
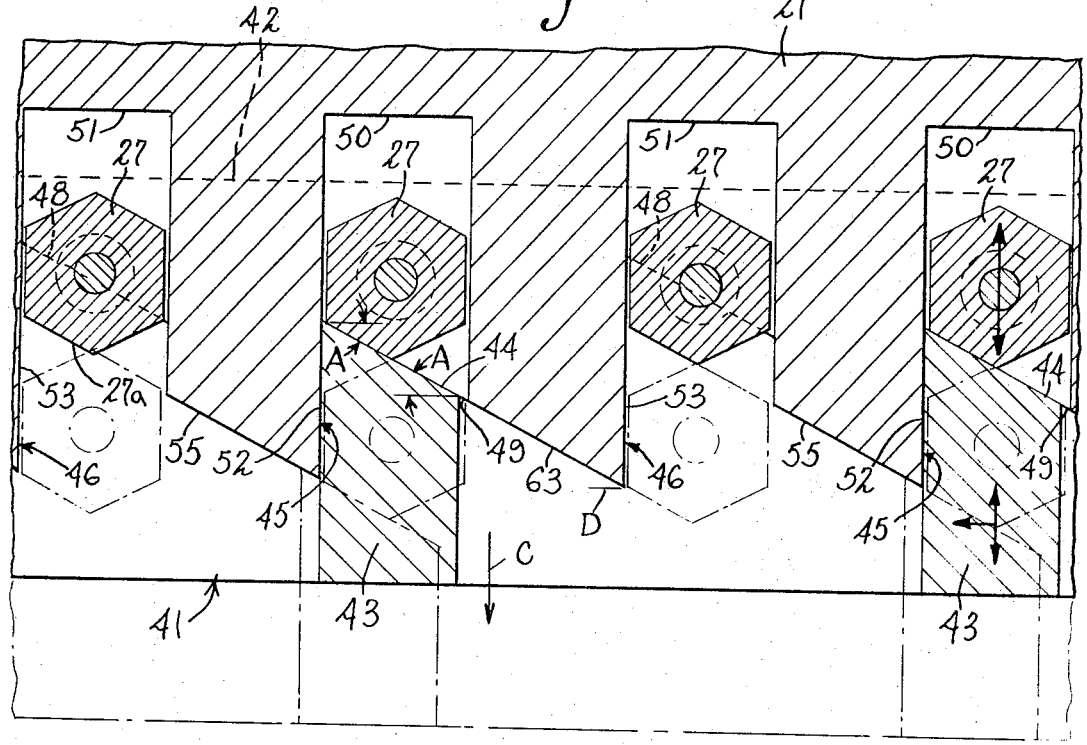
FIG. 5 is a sectional view seen along line 5—5 of FIG. 4 with the illustrated elements in one operative condition.

A chucking device embodying the invention comprises a spindle portion 10 having an outer cylindrical surface portion 11 and defining therein a receiving cavity 12 arranged to receive the shank 13 of a tool holder or tool 14. Cavity 12 is preferably of frusto-conical shape, tapered symmetrically about the axis of the chuck.

Spindle 10 has a radially extending annular flange 15. Carried on said flange as by means of bolts 16 is a housing member 17 having a generally cylindrical portion 18 with ports 19 defined therein around the periphery thereof. Secured to housing member 17 by means of bolts 20 is a retainer member 21 having pivotally mounted thereto a plurality of chuck jaws 22.

Slidably mounted on portion 18 of housing member 17 is an actuating member in the form of a magnetic plunger 23, which is arranged to be attracted towards coil 24 disposed about housing member 17. Coil 24 is carried on a mounting means indicated by the reference numerals 25, independently of spindle 10 and is not rotatable therewith. Extending through ports 19 are cams 27, each of which is mounted on a ring 28. Ring 28 is in turn secured to actuating plunger 23 by means of a plurality of bolts 29 extending through spacers 30, spacers 30 residing within the bounds of ports 19. With this construction, when actuating plunger 23 is attracted towards coil 24, camming members 27 are moved to the right, as viewed in FIG. 2. Plunger 23 may thus be considered a cam actuating member.

Disposed about cylindrical portion 11 of spindle 10 is a sleeve 31, movable axially thereon. Sleeve 31 is arranged to have two stable operating positions and, as hereinafter described, is a means or member for actuating jaws 22 between object grasping and release positions. Sleeve 31 has a small radially extending flange 32 and also carries thereon a plurality of jaw-actuating lugs or cams 33 preferably of a generally spherical configuration. Movable in one direction on sleeve 31 is a carrier member 35 which defines two spring retaining pockets 36 and 37. Carrier 35 has internal flanges 38 and 39. Flange 38 is disposed over flange 32 on sleeve 31 and thus defines the limits of movement of carrier 35 to the left, as viewed in FIG. 2. Rotatably mounted on carrier 35 by means of a bearing assembly 40 is a lock and release cam member 41. Sleeve 31 is continuously biased toward the left, as viewed in FIG. 2, and as hereinafter described, the position of cam member 41 determines which of two stable positions sleeve 31 will be in.

Figure 6:
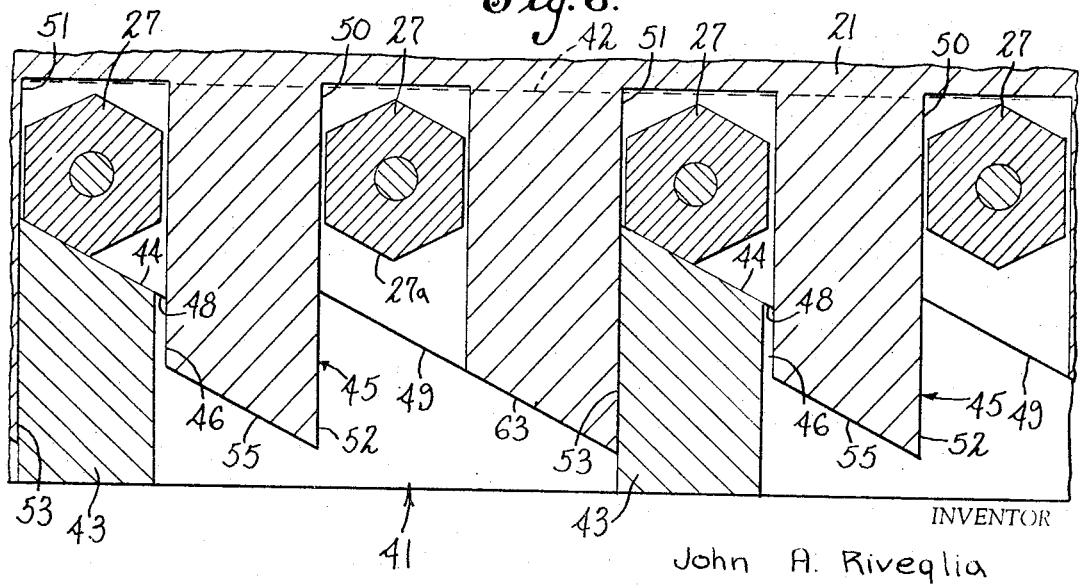
FIG. 6 is a sectional view also seen along line 5—5 of FIG. 4 with the illustrated elements in another operative condition.

Reference is now made to FIGS. 4, 5 and 6 for a more specific description of cam members 27, retainer member 21 and cam member 41. Cam member 41 comprises an annular portion 42 which is rotatable on carrier 35 and has a plurality of camming fingers 43 extending from the upper surface thereof and equally spaced about annular portion 42. Each of fingers 43 have a camming surface 44 at an angle A with respect to one side thereof. Each of the fingers 43 is arranged to fit into a groove or detent 45 or 46, which are equally spaced in retaining member 21. In the illustrated embodiment, there are twice as many detents as fingers 43. Therefore, the fingers 43 fit in alternate detents.

As may be seen in FIGS. 5 and 6, the fingers 43 may penetrate more deeply into detents 46 than into detents 45. Penetrating into detents 46 the cam surfaces 44 of fingers 43 abut surface 48 and in penetrating into detents 45 they would abut surface 49. Retainer member 21 has slots therein as indicated by the reference numerals 50 and 51, and these slots axially communicate with detents 45 and 46, respectively, and receive therein the cams 27 depending from actuating plunger 23.

The surfaces 48 and 49 are formed at the same angles A as surface 44. It will be apparent that the cam surfaces of cams 27 are also formed at the angle A. The surfaces 52 and 53 defining the detents 45 and 46 act as guides as will hereinafter be made apparent.

In operation, when an electrical impulse is applied to coil 24, plunger 23 is attracted thereto, cams 27 move with plunger 23 and their wedge shaped surfaces 27a act against surface 44 of fingers 43 and move fingers 43 and member 41 in the direction of the arrow C, FIG. 5. As seen in FIG. 5, surfaces 44 will tend to slide to the left on the surfaces 27a of cams 27. However, the surfaces 52 enforce linear movement until the fingers reach point D. This movement is transmitted through bearing 40 to spring carrier 35 which moves to the right as viewed in FIG. 2 and compresses spring 54. As the camming members 27 push fingers 43 in the direction of arrow C, when fingers 43 reach the point D the bias of spring 54 will urge surface 44 to slide along surface 27a onto surface 55 which separates detents 45 and 46. Thus, when fingers 43, and more specifically surfaces 44 thereof, slide across surface 55, they will be urged into detents 46 until they come into contact with surface 48.

Thus, there are two stable positions of member 41 depending upon which detents the fingers 43 fit into. As will be noted in FIGS. 5 and 6, member 41 is further to the left (as viewed in FIG. 2) when fingers 43 are in detents 46 than when fingers 43 are in detents 45. Therefore, all that is necessary to change the position of member 41 is to supply an electrical impulse to coil 24 which sets up a magnetic field attracting plunger 23. This produces movement of cams 27 to the right as viewed in FIG. 2 and resultant movement of member 41. Then the inclined surfaces 27a, 44 and 55 act under the force exerted by spring 54 to index the fingers 43 one groove to the left, as viewed in FIGS. 5 and 6. FIG. 6 as compared to FIG. 5 shows fingers 43 in detents 46 which allows spring 54 to move carrier member 35 further forward as more clearly shown in FIG. 7. When carrier member 35 is moved forward to a release and eject position, it moves with it sleeve 31 and lugs 33 thereon. Lugs 33 are received in a pocket 57 defined in each of the chuck jaws 22 and produce pivotal motion of the jaws 22 about their pivotal mounting 58 while the chuck jaws move to the position shown in FIG. 7. Simultaneously edge 59 of sleeve 31 exerts an axially ejecting force on shoulder 60 of tool holder 14. Shoulder 60 is preferably provided with splines 61, and jaws 22 are provided with mating splines 62 to positively insure that tool holder 14 will rotate with the chuck.

Assume now that the chuck is in the open position and another tool holder is to be inserted. As the tool holder is inserted, an electrical impulse is applied to coil 24. At this point, the fingers 43 are in detents 46 and jaws 22 are open as illustrated in FIG. 6. Actuating plunger 23 is attracted by coil 24 and cams 27 move to the right (FIGS. 2 and 7) until the surfaces 27a thereof reach point D, at which time the fingers 43 under the bias of spring 54 move to surfaces 63, and further under the bias of spring 54 slide down into a detent 45, as shown in FIG. 5. At this time, carrier 35 and sleeve 31 are in the position shown in FIG. 2 and fingers 43 are locked in detent 45. It will be noted that carrier 35 may move independently of sleeve 31 in one direction, that is, to the right as seen in FIGS. 2 and 7. Thus, as member 41 moves back when the fingers 43 are indexed from detents 46 to detents 45, carrier 35 through spring 64 moves sleeve 31 back until the end thereof abuts spindle 10, or rather the flange 15 thereof. Carrier 35 through member 41 may then be moved further to the right until fingers 43 commence to slide down surfaces 63 into detents 45, at which time spring 54 expands and moves the carrier 35 until fingers 43 are seated in detents 45 which determines a position of member 41, and carrier 35. Then spring 64 acts on flange 32 of sleeve 31 to move sleeve 31 to a jaw close position.

At this time, the chuck jaws are locked closed and may be opened only by application of another electrical impulse to coil 24 and actuation of plunger 23. It may thus be seen that except when a transition function is taking place sleeve 31 may be in only one of two stable positions, and is locked in such position by fingers 43 in either of the two sets of detents 45 or 46.

It may thus be seen that the chuck jaws have only two stable positions, one being when opened when fingers 43 are in detents 46 and the other being closed when fingers 43 are in detents 45. Each electrical impulse applied to coil 24 will index the fingers 43 and the camming member on which they are carried one detent to the left, as viewed in FIGS. 5 and 6, and will alternately open jaws 22 and eject a tool holder or close jaws 22 and lock a tool holder in the chuck. The mechanism, therefore, must always be in one of two states, except when transition from one state to another is taking place.

The spring 64 provides a dual function. It maintains pressure on the chuck jaws 22 during the operation of spindle 10 and also serves to drive the rotating cam member 41 to its farthest position to the left as viewed in FIGS. 2 and 7. Sleeve 31 also serves a dual function in that it actuates the chuck jaws 22 and also at least partially ejects the tool holder from cavity 12.

In the disclosed embodiment of the invention, six chuck jaws 22 are provided which are pivotally mounted at 58 to retainer member 21 between lugs 66 thereon. Each chuck jaw is provided with a spring 67 secured at one end thereof at 68 to the chuck jaw and extending about the pivotal connection to retainer member 21 having the other end 69 thereof locked over the end of retainer member 21. The springs 67 bias the chuck jaws toward a closed position, thus assuring that the chuck jaws can be opened only by movement of sleeve 31.

The plunger 23 and hence the camming elements 27 carried thereby are biased by springs 70. The biasing springs 70 are formed from an annular ring of spring material 71, FIG. 8. The biasing springs 70 are merely fingers struck from the ring. The function of springs 70 is to reposition the plunger 23 to a neutral position after actuation thereof.

From the foregoing it may be seen that a chuck embodying the invention is quite positive in grasping or releasing an object, and in view of the fact that it has two stable states, it lends itself very well to automatically controlled machine tools, such as numeric controls wherein a signal may be furnished from a medium such as continuous tape, or it may be actuated by an electrical impulse.

Alternatively, an electrical impulse may be applied to coil 24 through the closing of a proximity or limit switch which would be tripped by an arm of an automatic tool changer in inserting or removing a tool from the chuck. Still further, the coil 24 may be supplied an electrical impulse manually as by means of the circuit of FIG. 9. In the circuit of FIG. 9, when the switch 72 is depressed, uni-directional current from a source such as battery 73, is applied to coil 24. The electrical impulse needs only to be applied momentarily and a sufficient time to cause plunger 23 to move camming elements 27 a sufficient distance to index portion 42 one notch and thus change the condition of the chuck.

A device embodying the invention has been disclosed as having two stable operative states. However, a device may be constructed having more than two such stable states. Assume that the sleeve 31 were to have three stable positions. Then there would be three sets of detent slots, every third slot being equal in depth. The fingers 43 would then be spaced every third slot. The number of detent slots would be N and the number of fingers would be M. The number of positions would be $N/M$ or three. In the instant disclosure, the quantity $N/M$ is two. The quantity $N/M$ will always be an integer and express the number of stable operative positions of the actuated means, the jaws 22.

It may thus be seen that the objects of the invention set forth as well as those made apparent from the foregoing description are efficiently attained. Since modifications to the disclosed embodiment of the invention as well as other embodiments thereof may occur to others skilled in the art which do not depart from the spirit and scope of the invention, it is intended in the appended claims to cover all modifications to the disclosed embodiment of the invention as well as other embodiments thereof which do not depart from the spirit and scope of the invention.

What is claimed is:

1. A chuck comprising a rotatable drive member having an outer surface and defining longitudinally therein an object receiving cavity, a plurality of jaws pivotally mounted to said chuck and movable between open and closed positions to engage or release an object in the cavity, a jaw actuating member slidably mounted on said surface and operative to move said jaws between open and closed positions, said actuating member having two stable positions on said surface corresponding to the open and closed positions of said jaws, camming means operative to move said actuating member between said two positions, means for moving said camming means, and detent means controlling the degree of movement of said actuating member between said two positions and maintaining said actuating member in one of said two positions.

2. A chuck comprising a rotatable drive member having an outer surface and defining longitudinally therein an object receiving cavity, a plurality of jaws movably mounted to said chuck and movable between open and closed positions to engage or release an object in said cavity, a jaw actuating member slidably mounted on said surface and operative to move said jaws between open and closed positions, said actuating member having two stable positions on said surface corresponding to the open and closed positions of said jaws, control means for moving said actuating member between said two positions and detent means for controlling the travel of said actuating member and maintaining said actuating member in one of said two positions.

3. The chuck of claim 2 wherein said jaws are constructed and arranged to engage a flange on an object inserted in said cavity.

4. The apparatus of claim 2 wherein said actuating member has a portion thereon arranged to abut a flange on an object in said cavity and exert a force thereon to move the object from said cavity when said actuating means moves to a position to open said jaws.

5. A chuck comprising a rotatable drive member having an outer surface and defining therein an object receiving cavity, a plurality of jaws movably mounted on said chuck and movable between open and closed positions to engage or release an object in the cavity, a jaw actuating member slidably mounted on said surface and operative to move said jaws between open and closed positions, said actuating member having two stable positions on said surface corresponding to the open and closed positions of said jaws, and means for moving said actuating member between said two positions and maintaining said actuating member in one of said two positions, said actuating member being constructed and arranged to engage and exert an expelling force on a flange on an object in the cavity to initiate ejection of the object therefrom when said actuating member moves to a jaw open position.

6. A chuck comprising a rotatable drive member having an outer surface and defining therein an object receiving cavity, a plurality of jaws pivotally mounted to said chuck and movable between open and closed positions to engage or release an object in the cavity, a jaw actuating member slidably mounted on said surface and operative to move said jaws between open and closed positions, said actuating member having two stable positions on said surface corresponding to the open and closed positions of said jaws, means biasing said actuating member toward said two positions, and detent means controlling the degree of movement of said actuating member under the force of said biasing means.

7. A mechanism comprising a guide member, actuated means having a plurality of finite operative positions and being movable sequentially between said positions, an actuating member guidably mounted on said guide member and operative to move said actuated means between said positions, said actuating member having the same plurality of stable positions on said guide member corresponding to the number of finite positions of said actuated means, camming means operative to move said actuating member between said positions, means for moving said camming means and detent means controlling the degree of movement of said actuating member between said positions in a given sequence and maintaining said actuating member in a corresponding one of said positions.

8. A chuck comprising a rotatable drive member having an outer surface and defining longitudinally therein an object receiving cavity, a plurality of jaws pivotally mounted to said chuck and movable between a predetermined number of finite positions, a jaw actuating member slidably mounted on said surface and operative to move said jaws between said positions, said actuating member having a number of stable positions on said surface corresponding to the predetermined positions of said jaws, means biasing said actuating member toward said positions, and detent means having the same number of positions controlling the degree of movement of said actuating member under the force of said biasing means, said detent means comprising a ring member having equally spaced axially extending grooves, said grooves being of different depths, providing sets of grooves equal in number to the number of said stable positions, all grooves of a set being of equal depth but unequal to the other sets, said grooves being in sequentially repeating positions in said ring member, said ring member providing camming surfaces between said grooves which are all equally angled in the same direction toward an adjacent groove, a cam member having cam fingers extending therefrom so as to be received only in one set of grooves at any given time, said fingers having leading surfaces matingly angled to said camming surfaces, actuating cams associated with each of said grooves and arranged to simultaneously push said fingers from one set of grooves to the edges of the camming surfaces there adjacent, said cam member being rotatably carried on said jaw actuating member, said biasing means acting on said jaw actuating member to hold said fingers in a given set of grooves so that when said actuating cams push said fingers to said camming surfaces, said biasing means urges said fingers along said camming surfaces to the next set of grooves, positioning of said fingers between said sets of grooves under said biasing means being effective to define the stable positions of said jaw actuating member.

9. A chuck comprising a rotatable drive member having an outer surface and defining longitudinally therein an object receiving cavity, a plurality of jaws pivotally mounted to said chuck and movable between two predetermined positions, a jaw actuating member slidably mounted on said surface and operative to move said jaws between said two positions, said actuating member having two stable positions on said surface corresponding to the predetermined positions of said jaws, means biasing said actuating member toward said two positions and detent means having two positions controlling the degree of movement of said actuating member under the force of said biasing means, said detent means comprising a ring member having equally spaced axially extending grooves, said grooves being of two different depths, providing two sets of grooves, all grooves of a set being of equal depth but unequal to the other set, said grooves being in sequentially repeating positions in said ring member, said ring member providing camming surfaces between said grooves which are all equally angled in the same direction toward an adjacent groove, a cam member having a plurality of cam fingers extending therefrom so as to be received only in one set of grooves at any given time, said fingers having leading surfaces matingly angled to said camming surfaces, and actuating cams associated with each of said grooves and arranged to simultaneously push said fingers from one set of grooves to the edges of the camming surfaces there adjacent, said cam member being rotatably carried on said jaw actuating member, said biasing means acting on said jaw actuating member to hold said fingers in a given set of grooves so that when said actuating cams push said fingers to said camming surfaces, said biasing means urges said fingers along said camming surfaces to the next set of grooves, positioning of said fingers between said sets of grooves under said biasing means being effective to define the stable positions of said jaw actuating member.

10. A tool holder, a rotatable drive member having an outer surface and defining longitudinally therein a cavity arranged to receive said tool holder, a plurality of jaws pivotally mounted to said drive member and movable between two predetermined positions to engage or release said tool holder, a jaw actuating member slidably mounted on said surface and operative to move said jaws between said two positions, said actuating member having two stable positions on said surface corresponding to the two predetermined positions of said jaws, means biasing said actuating member toward said two positions, and detent means having two positions controlling the degree of movement of said actuating member under the force of said biasing means, said detent means comprising a ring member having equally spaced axially extending grooves, said grooves being of two different depths, providing two sets of grooves, all grooves of a set being of equal depth but unequal to the other set, said grooves being in alternate positions in said ring member, said ring member providing camming surfaces between said grooves which are all equally angled in the same direction toward an adjacent groove, a cam member having a plurality of cam fingers extending therefrom so as to be received only in one set of grooves at any given time, said fingers having leading surfaces matingly angled to said camming surfaces, and actuating cams associated with each of said grooves and arranged to simultaneously push said fingers from one set of grooves to the edges of the camming surfaces there adjacent, said cam member being rotatably carried on said jaw actuating member, said biasing means acting on said jaw actuating member to hold said fingers in a given set of grooves so that when said actuating cams push said fingers to said camming surfaces, said biasing means urges said fingers along said camming surfaces to the next set of grooves, positioning of said fingers between said sets of grooves under said biasing means being effective to define the stable positions of said jaw actuating member.

11. A chuck comprising, a spindle having means defining an axially extending tool holding cavity therein, said defining means having an outer cylindrical surface, a housing member carried on said spindle and surrounding said cylindrical surface, a retainer member carried on said housing member, said retainer member defining a plurality of grooves axially extending and surrounding said cavity, said grooves being of two dimensions in depth with every other groove being of equal dimension, said retainer member having surfaces between said grooves which are disposed at equal angles from the edge of one groove to the edge of the next, said retainer member having slots recessed therein and providing partial continuations of said grooves, an annular cam member having axially extending fingers spaced thereon to be received in every other groove, said fingers having frontal cam surfaces thereon formed at angles equal to the angles of the surfaces between said grooves, a cam actuating member disposed outwardly of said grooves and having camming elements extending into each of said grooves, said cam actuating member being movable axially to engage said fingers in said grooves and move said fingers out of said grooves to a position where the cam surfaces of said fingers will engage the cam surfaces between said grooves, means biasing said cam member toward said retainer member so that when said fingers of said cam member are forced out of said grooves and said cam surfaces engage said angled surfaces said biasing means moves said fingers toward an adjacent groove, carrier means on said cylindrical surface, means rotatably mounting said cam member on said carrier means, said biasing means acting on said carrier means, and jaw means actuated by said carrier means to clamp or release an object in said cavity.

12. The chuck of claim 11 wherein said cam actuating member is actuated magnetically to engage and move said fingers to the cam surfaces between said grooves.

References Cited

UNITED STATES PATENTS

| | | | |
|---|---|---|---|
| 684,594 | 10/1901 | Austin | 279—71 |
| 2,448,817 | 9/1948 | McArthur | 279—37 X |
| 3,168,322 | 2/1965 | Dziedzic | 279—4 |

FOREIGN PATENTS

| | | |
|---|---|---|
| 227,386 | 1/1925 | Great Britain. |
| 409,698 | 2/1945 | Italy. |

ROBERT C. RIORDON, *Primary Examiner.*

E. A. CARPENTER, *Assistant Examiner.*